United States Patent
Brady et al.

(10) Patent No.: US 7,982,078 B2
(45) Date of Patent: *Jul. 19, 2011

(54) PRODUCTION OF DIESEL FUEL FROM BIORENEWABLE FEEDSTOCKS WITH SELECTIVE SEPARATION OF CONVERTED OXYGEN

(75) Inventors: John P. Brady, Algonquin, IL (US); Tom N. Kalnes, LaGrange, IL (US); Terry L. Marker, Palos Heights, IL (US)

(73) Assignee: UOP LLC, Des Plaines, IL (US)

( * ) Notice: Subject to any disclaimer, the term of this patent is extended or adjusted under 35 U.S.C. 154(b) by 421 days.

This patent is subject to a terminal disclaimer.

(21) Appl. No.: 12/193,196

(22) Filed: Aug. 18, 2008

(65) Prior Publication Data

US 2009/0077868 A1   Mar. 26, 2009

Related U.S. Application Data

(60) Provisional application No. 60/973,816, filed on Sep. 20, 2007.

(51) Int. Cl.
    *C07C 1/00* (2006.01)
    *C07C 4/00* (2006.01)

(52) U.S. Cl. ........................ 585/240; 585/242
(58) Field of Classification Search ........... 585/240, 585/241, 242
See application file for complete search history.

(56) References Cited

U.S. PATENT DOCUMENTS

| | | | |
|---|---|---|---|
| 5,186,722 A | 2/1993 | Cantrell et al. | |
| 5,705,722 A * | 1/1998 | Monnier et al. | 585/240 |
| 6,787,026 B2 * | 9/2004 | Farshid | 208/89 |
| 7,232,935 B2 | 6/2007 | Jakkula et al. | |
| 7,279,018 B2 | 10/2007 | Jakkula et al. | |
| 7,425,657 B1 | 9/2008 | Elliott et al. | |
| 7,459,597 B2 | 12/2008 | Koivusalmi et al. | |
| 7,491,858 B2 | 2/2009 | Murzin et al. | |
| 7,501,546 B2 | 3/2009 | Koivusalmi et al. | |
| 7,511,181 B2 * | 3/2009 | Petri et al. | 585/240 |
| 7,540,952 B2 | 6/2009 | Pinho et al. | |
| 7,550,634 B2 * | 6/2009 | Yao et al. | 585/240 |
| 2006/0186020 A1 | 8/2006 | Gomes | |
| 2006/0207166 A1 | 9/2006 | Herskowitz et al. | |
| 2007/0006523 A1 | 1/2007 | Myllyoja et al. | |
| 2007/0010682 A1 | 1/2007 | Myllyoja et al. | |

(Continued)

FOREIGN PATENT DOCUMENTS

CN     11270300 A     9/2008

(Continued)

*Primary Examiner* — N. Bhat
(74) *Attorney, Agent, or Firm* — Maryann Maas

(57) ABSTRACT

A process has been developed for producing diesel boiling range fuel from renewable feedstocks such as plant and animal fats and oils, the process providing for sulfur management. The process involves catalytically treating a renewable feedstock by hydrogenating and deoxygenating to provide a hydrocarbon fraction useful as a diesel boiling range fuel. The hydrocarbon fraction is isomerized to improve cold flow properties. A selective separation such as a hot high pressure hydrogen stripper is used to remove at least the carbon oxides from the first zone effluent before entering the isomerization zone, and to provide liquid recycle to the treating zone at pressure and temperature. A vapor stream is separated from the isomerization effluent and at least carbon dioxide is removed using at least one selective or flexible amine solution absorber. The resulting hydrogen-rich stream is recycled to the deoxygenation reaction zone.

16 Claims, 3 Drawing Sheets

U.S. PATENT DOCUMENTS

| | | |
|---|---|---|
| 2007/0068848 A1 | 3/2007 | Monnier et al. |
| 2007/0131579 A1 | 6/2007 | Koivusalmi et al. |
| 2007/0135316 A1 | 6/2007 | Koivusalmi et al. |
| 2007/0135663 A1 | 6/2007 | Aalto et al. |
| 2007/0161832 A1 | 7/2007 | Myllyoja et al. |
| 2007/0170091 A1 | 7/2007 | Monnier et al. |
| 2007/0175795 A1 | 8/2007 | Yao et al. |
| 2007/0260102 A1* | 11/2007 | Duarte Santiago et al. .. 585/733 |
| 2007/0281875 A1 | 12/2007 | Scheibel et al. |
| 2007/0287873 A1 | 12/2007 | Coupard et al. |
| 2007/0299291 A1 | 12/2007 | Koivusalmi |
| 2008/0025903 A1 | 1/2008 | Cortright |
| 2008/0033188 A1 | 2/2008 | Dumesic et al. |
| 2008/0045731 A1 | 2/2008 | Zhang |
| 2008/0050792 A1 | 2/2008 | Zmierczak et al. |
| 2008/0052983 A1 | 3/2008 | Aulich et al. |
| 2008/0066374 A1 | 3/2008 | Herskowitz |
| 2008/0092436 A1 | 4/2008 | Seames et al. |
| 2008/0132435 A1 | 6/2008 | Ferreira Fontes et al. |
| 2008/0156694 A1 | 7/2008 | Chapus et al. |
| 2008/0161614 A1 | 7/2008 | Bertoncini et al. |
| 2008/0161615 A1 | 7/2008 | Chapus et al. |
| 2008/0163543 A1 | 7/2008 | Abhari et al. |
| 2008/0173570 A1 | 7/2008 | Marchand et al. |
| 2008/0216391 A1 | 9/2008 | Cortright et al. |
| 2008/0229654 A1 | 9/2008 | Bradin |
| 2008/0244962 A1 | 10/2008 | Abhari et al. |
| 2008/0281134 A1 | 11/2008 | Ghonasgi et al. |
| 2008/0300434 A1 | 12/2008 | Cortright et al. |
| 2008/0300435 A1 | 12/2008 | Cortright et al. |
| 2008/0302001 A1 | 12/2008 | Koivusalmi et al. |
| 2008/0308457 A1 | 12/2008 | Dindi et al. |
| 2008/0308458 A1 | 12/2008 | Dindi et al. |
| 2008/0312480 A1 | 12/2008 | Dindi et al. |
| 2008/0313955 A1 | 12/2008 | Silva et al. |
| 2009/0014354 A1 | 1/2009 | Knuuttila et al. |
| 2009/0019763 A1 | 1/2009 | Ghonasgi et al. |
| 2009/0029427 A1 | 1/2009 | Miller |
| 2009/0031617 A1 | 2/2009 | O'Rear |
| 2009/0062578 A1 | 3/2009 | Koivusalmi et al. |
| 2009/0069610 A1 | 3/2009 | Roberts, IV et al. |
| 2009/0071872 A1 | 3/2009 | Ginosar et al. |
| 2009/0077864 A1 | 3/2009 | Marker et al. |
| 2009/0077865 A1 | 3/2009 | Kalnes et al. |
| 2009/0077866 A1 | 3/2009 | Kalnes et al. |
| 2009/0077867 A1 | 3/2009 | Marker et al. |
| 2009/0078611 A1 | 3/2009 | Marker et al. |
| 2009/0082603 A1 | 3/2009 | Kalnes et al. |
| 2009/0082606 A1 | 3/2009 | Marker et al. |
| 2009/0084026 A1 | 4/2009 | Miller |
| 2009/0088351 A1 | 4/2009 | Miller |
| 2009/0107033 A1 | 4/2009 | Gudde et al. |
| 2009/0124839 A1 | 5/2009 | Dumesic et al. |
| 2009/0126260 A1 | 5/2009 | Aravanis et al. |
| 2009/0193709 A1 | 8/2009 | Marker et al. |

FOREIGN PATENT DOCUMENTS

| | | |
|---|---|---|
| CN | 11343552 A | 1/2009 |
| EP | 1719811 A1 | 8/2006 |
| EP | 2046917 | 1/2008 |
| WO | 2007063874 A1 | 6/2007 |
| WO | 2007064015 A1 | 6/2007 |
| WO | 2007064019 A1 | 6/2007 |
| WO | WO 2007/064019 A1 | 6/2007 |
| WO | WO 2007063874 A1 | 6/2007 |
| WO | WO 2007064015 A1 | 6/2007 |
| WO | 2007125332 A1 | 11/2007 |
| WO | WO 2007/125332 A1 | 11/2007 |
| WO | 2007141293 A1 | 12/2007 |
| WO | WO 2007/141293 A1 | 12/2007 |
| WO | 2008012415 A2 | 1/2008 |
| WO | WO 2008/012415 A2 | 1/2008 |
| WO | 2008020048 A2 | 2/2008 |
| WO | WO 2008/020048 A2 | 2/2008 |
| WO | 2008053284 A1 | 5/2008 |
| WO | WO 2008/053284 A1 | 5/2008 |
| WO | 2008101945 A1 | 8/2008 |
| WO | WO 2008/101945 A1 | 8/2008 |
| WO | 2008105518 A1 | 9/2008 |
| WO | 2008119895 A2 | 9/2008 |
| WO | WO 2008/105518 A1 | 9/2008 |
| WO | WO 2008/119895 A2 | 9/2008 |
| WO | 2008141830 A1 | 11/2008 |
| WO | 2008141831 A1 | 11/2008 |
| WO | WO 2008/141830 A1 | 11/2008 |
| WO | WO 2008/141831 A1 | 11/2008 |
| WO | 2008151792 A1 | 12/2008 |
| WO | 2008152199 A1 | 12/2008 |
| WO | WO 2008/151792 A1 | 12/2008 |
| WO | WO 2008/152199 A1 | 12/2008 |
| WO | 2009004181 A2 | 1/2009 |
| WO | 2009011639 A2 | 1/2009 |
| WO | 2009013233 A2 | 1/2009 |
| WO | WO 2009/004181 A2 | 1/2009 |
| WO | WO 2009/011639 A2 | 1/2009 |
| WO | WO 2009/013233 A2 | 1/2009 |
| WO | 2009020055 A1 | 2/2009 |
| WO | 2009025542 A1 | 2/2009 |
| WO | WO 2009/020055 A1 | 2/2009 |
| WO | WO 2009/025542 A1 | 2/2009 |
| WO | 2009059819 A1 | 5/2009 |
| WO | 2009059920 A2 | 5/2009 |
| WO | WO 2009/059819 A1 | 5/2009 |
| WO | WO 2009/059920 A2 | 5/2009 |

* cited by examiner

PRODUCTION OF DIESEL FUEL FROM BIORENEWABLE FEEDSTOCKS WITH SELECTIVE SEPARATION OF CONVERTED OXYGEN

CROSS-REFERENCE TO RELATED APPLICATION

This application claims priority from Provisional Application Ser. No. 60/973,816 filed Sep. 20, 2007, the contents of which are hereby incorporated by reference in its entirety.

FIELD OF THE INVENTION

This invention relates to a process for producing hydrocarbons useful as diesel boiling range fuel or fuel blending component from renewable feedstocks such as the glycerides and free fatty acids found in materials such as plant and animal fats and oils. Hydrogenation and deoxygenation is followed by isomerization in one or more reactors. A hot high pressure hydrogen stripper is used to selectively remove at least the carbon oxides from the first zone effluent before entering the isomerization zone. A vapor stream is separated from the isomerization effluent and carbon dioxide is separated from the vapor stream. Optionally, a sulfur containing stream may also be separated. The depleted vapor stream containing largely hydrogen is recycled to the first reaction zone.

BACKGROUND OF THE INVENTION

As the demand for diesel boiling range fuel increases worldwide there is increasing interest in sources other than crude oil for producing diesel boiling range fuel and diesel boiling range fuel blending components. One such renewable source is what has been termed biorenewable sources. These renewable sources include, but are not limited to, plant oils such as corn, rapeseed, canola, soybean and algal oils, animal fats such as inedible tallow, fish oils and various waste streams such as yellow and brown greases and sewage sludge. The common feature of these sources is that they are composed of glycerides and Free Fatty Acids (FFA). Both of these classes of compounds contain aliphatic carbon chains having from about 8 to about 24 carbon atoms. The aliphatic carbon chains in the glycerides or FFAs can be fully saturated, or mono, di or poly-unsaturated.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Applicants have developed a process which comprises one or more steps to hydrogenate and deoxygenate (via catalytic decarboxylation, decarbonylation and/or hydrodeoxygenation) and isomerize the feedstock. The performance of the isomerization catalyst is improved by removing at least carbon dioxide from the feed to the isomerization zone. The presence of carbon dioxide or other carbon oxides may result in the deactivation of the isomerization catalyst. The carbon dioxide is removed using a hot high pressure hydrogen stripper. The effluent from the isomerization zone is separated into at least a vapor portion and a liquid portion. The vapor portion is treated using an amine absorber solution to remove at least the carbon dioxide and optionally the hydrogen sulfide so that the remaining hydrogen can be recycled back to the first reaction zone. The separated carbon dioxide and the separated hydrogen sulfide may be used for other purposes.

SUMMARY OF THE INVENTION

A hydroconversion process for producing an isoparaffin-rich diesel product from a renewable feedstock wherein the process comprises treating the feedstock in a catalytic reaction zone by hydrogenating and deoxygenating the feedstock at reaction conditions to provide a first reaction product comprising a hydrocarbon portion comprising n-paraffins and a gaseous portion comprising at least carbon dioxide and hydrogen. At least one sulfur containing component is present in the reaction mixture. The sulfur containing component may be present as a naturally occurring contaminant or may be intentionally added to the feedstock or reaction mixture. Many sulfur containing components will form hydrogen sulfide in the reactor.

The carbon dioxide and water generated as byproducts in the first reaction zone are removed from the first reaction product in an integrated a hot high pressure hydrogen stripper using a high purity hydrogen stream as the stripping gas. The hydrogen stripped first reaction product is passed to a hydroisomerization reaction zone to form isomerized product. The effluent is combined with the carbon dioxide and water stream from the hot high pressure hydrogen stripper and cooled and phase separated to form a vapor potion and a liquid portion. The vapor portion comprises at least hydrogen, carbon dioxide, and hydrogen sulfide. The carbon dioxide is then separated from the hydrogen using at least one selective amine absorber solution. The hydrogen sulfide may be removed from the vapor stream using the amine absorber solution, or the amine absorber solution may be specially chosen to allow the hydrogen sulfide to recycle with the hydrogen to the reactor. In one embodiment, the amine absorber solution may be in a flexible absorber.

BRIEF DESCRIPTION OF THE DRAWINGS

FIG. 1 is a more simplistic schematic, while FIG. 2 is more detailed.

DETAILED DESCRIPTION OF THE INVENTION

Figure 1:
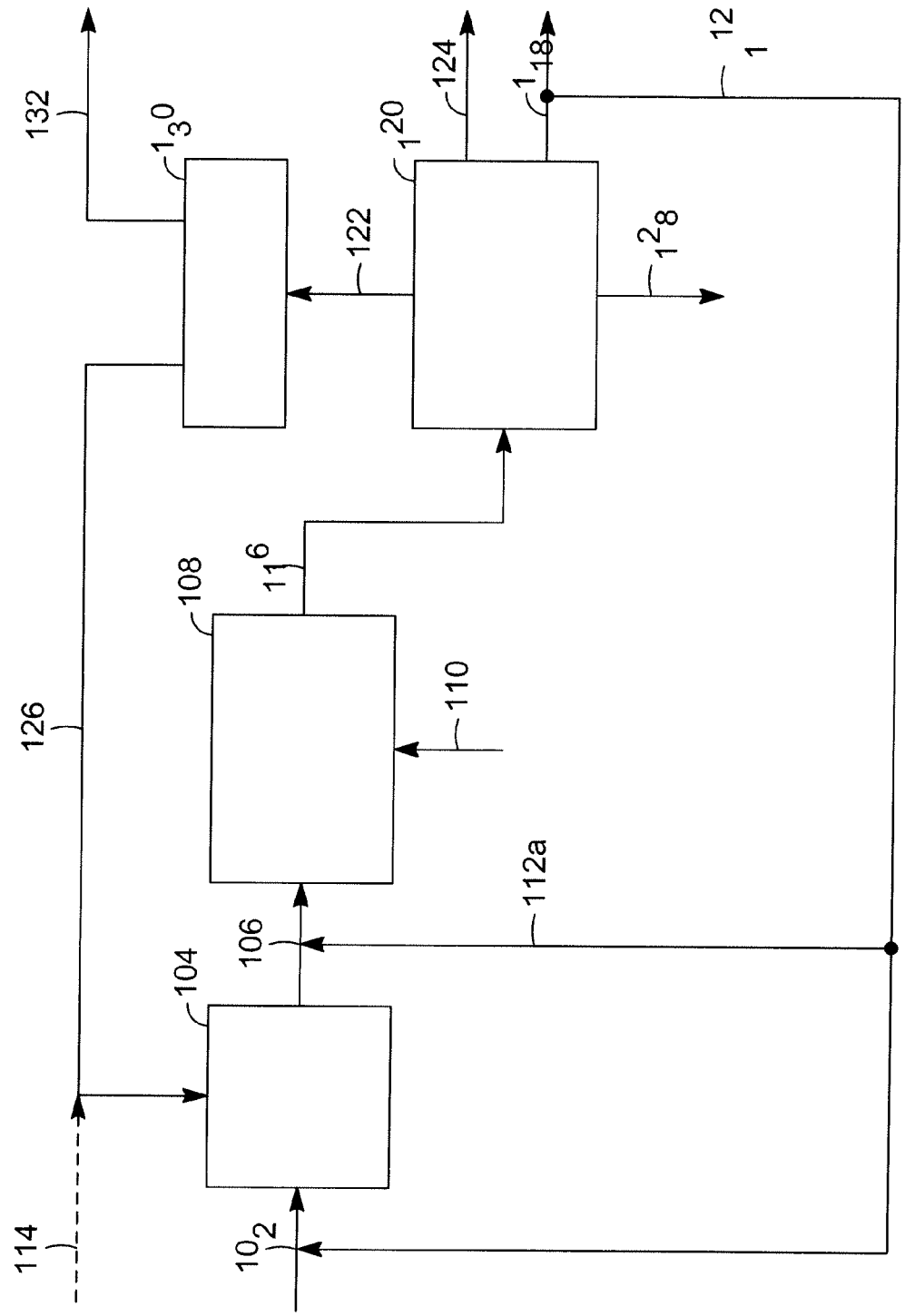
FIG. 1 and FIG. 2 are schematics of one embodiment of the invention.

As stated, the present invention relates to a process for producing a hydrocarbon stream useful as diesel boiling range fuel from renewable feedstocks such as renewable feedstocks originating from plants or animals. Some of these feedstocks are known as biorenewable fats and oils. The term renewable feedstock is meant to include feedstocks other than those obtained from crude oil. The renewable feedstocks that can be used in the present invention include any of those which comprise glycerides and free fatty acids (FFA). Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, jatropha oil, tallow, yellow and brown greases, lard, train oil, fats in milk, fish oil, algal oil, sewage sludge, and the like. Additional examples of renewable feedstocks include non-edible vegetable oils from the group comprising *Jatropha curcas* (Ratanjoy, Wild Castor, Jangli Erandi), *Madhuca indica* (Mohuwa), *Pongamia pinnata* (Karanji Honge), and *Azadiracta indicia* (Neem). The triglycerides and FFAs of the typical vegetable or animal fat contain aliphatic hydrocarbon chains in their structure which have about 8 to about 24 carbon atoms with a majority of the fats and oils containing high concentrations of fatty acids with 16 and 18 carbon atoms. Mixtures or co-feeds of renewable feedstocks and hydrocarbons from petroleum crude oil may also be used as the feedstock. Other feedstock components which may be used, especially as a co-feed component in combination with the above listed feedstocks, include spent motor oils and industrial lubricants, used paraffin waxes, liquids derived from the gasification of coal, biomass, or natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. In some applications, an advantage of using a co-feed component is the transformation of what may have been considered to be a waste product from a petroleum based or other process into a valuable co-feed component to the current process.

Renewable feedstocks that can be used in the present invention may contain a variety of impurities. For example, tall oil is a byproduct of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow. The conditions at which the reactor is operated are well known in the art.

Another possible means for removing contaminants is a mild acid wash. This is carried out by contacting the feedstock with an acid such as sulfuric, nitric or hydrochloric acid in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in U.S. application Ser. No. 11/770,826, incorporated by reference, is another pretreatment technique which may be employed.

The renewable feedstock is flowed to a first reaction zone comprising one or more catalyst beds in one or more reactors. The term "feedstock" is meant to include feedstocks that have not been treated to remove contaminants as well as those feedstocks purified in a pretreatment zone. In the reaction first zone, the feedstock is contacted with a hydrogenation or hydrotreating catalyst in the presence of hydrogen at hydrogenation conditions to hydrogenate the olefinic or unsaturated portions of the n-paraffinic chains. Hydrogenation or hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina. Hydrogenation conditions include a temperature of about 40° C. to about 400° C. and a pressure of about 689 kPa absolute (100 psia) to about 13,790 kPa absolute (2000 psia). In another embodiment the hydrogenation conditions include a temperature of about 200° C. to about 300° C. and a pressure of about 1379 kPa absolute (200 psia) to about 4826 kPa absolute (700 psia). Other operating conditions for the hydrogenation zone are well known in the art.

The hydrogenation or hydrotreating catalysts enumerated above are also capable of catalyzing decarbonylation, decarboxylation, and/or hydrodeoxygenation of the feedstock to remove oxygen. Decarbonylation, decarboxylation, hydrodeoxygenation and hydrogenation are herein collectively referred to as deoxygenation reactions. Decarboxylation conditions include a relatively low pressure of about 3447 kPa (500 psia) to about 6895 kPa (1000 psia), a temperature of about 200° C. to about 400° C. and a liquid hourly space velocity of about 0.5 to about 10 $hr^{-1}$. In another embodiment the decarboxylation conditions include the same relatively low pressure of about 3447 kPa (500 psia) to about 6895 kPa (1000 psia), a temperature of about 288° C. to about 345° C. and a liquid hourly space velocity of about 1 to about 4 $hr^{-1}$. Since hydrogenation is an exothermic reaction, as the feedstock flows through the catalyst bed the temperature increases and decarboxylation and hydrodeoxygenation will begin to occur. Thus, it is envisioned and is within the scope of this invention that all reactions may occur simultaneously in one reactor or in one bed. Alternatively, the conditions can be controlled such that hydrogenation primarily occurs in one bed and decarboxylation, decarbonylation, and/or hydrodeoxygenation occurs in a second bed. Of course if only one bed is used, then hydrogenation occurs primarily at the front of the bed, while decarboxylation, decarbonylation, and hydrodeoxygenation occurs mainly in the middle and bottom of the bed. Finally, desired hydrogenation can be carried out in one reactor, while decarboxylation, decarbonylation and/or hydrodeoxygenation can be carried out in a separate reactor.

Sulfur containing components are often present in the reaction mixture. Such components may be present in the feedstock naturally, or may be added to the feedstock or the reaction zone. Sulfur-containing components may be organic, inorganic, natural, or synthetic. A single sulfur-containing component may be present or more than one may be present. The sulfur containing component may be present in an amount ranging from about 1 ppm to about 5 mass-%. Many sulfur containing components are converted to hydrogen sulfide in the reaction zone. For ease of understanding, the description below will use the term hydrogen sulfide as the primary example of a sulfur containing component, but that is not meant to limit the scope of the claims in any way.

The reaction product from the deoxygenation reactions will comprise a liquid portion and a gaseous portion. The liquid portion comprises a hydrocarbon fraction which is primarily paraffins (no more than 5 or 10 mass-% branched paraffins) and having a large concentration of paraffins in the range of about 9 to about 18 carbon atoms. Different feedstocks will result in different distributions of paraffins. The gaseous portion comprises hydrogen, carbon dioxide, carbon monoxide, water vapor, propane, at least one sulfur component such as hydrogen sulfide, and perhaps phosphorous component such as phosphine. The effluent from the deoxygenation reactor is conducted to a hot high pressure hydrogen stripper.

One benefit of the hot high pressure hydrogen stripper is that a liquid stream of paraffins is generated at or near to the temperature and pressure of the reaction zone, and a portion of that stream may be recycled to the reaction zone with minimal pumping energy and minimal additional heating. Saving the utilities of pumping and reheating can significantly reduce the cost of the overall process and if the recycle stream is large enough would more than offset the additional capital cost of the hot high pressure hydrogen stripper. Likewise the net liquid going to the product recovery column needs less heating to separate light byproducts. Another benefit is the liquid stream is essentially dry and therefore does not carry water back to the reactor. In addition, the separation in the cold product separator (downstream) becomes more efficient since the phase separation does not include the densest hydrocarbons having from 8 to about 24 or more carbon atoms. Furthermore, any unreacted tri-mono glycerides or free fatty acids present in the reactor effluent during a unit start-up or unit upset are selectively removed in the hot separator liquid and do not come into contact with a condensed water phase where they could contaminate the byproduct water.

The reaction zone effluent enters the hot high pressure hydrogen stripper and the water and normally gaseous components, are carried with the hydrogen stripping gas and separated into an overhead stream. By using a dry hydrogen stream as the stripping gas, water, carbon monoxide, carbon dioxide, and any ammonia or hydrogen sulfide are selectively separated from the hydrocarbon liquid product in the hot high pressure hydrogen stripper. The hydrogen stripping gas can be hydrogen make-up gas that is effectively free of carbon oxides and water. By effectively free, it is meant that the hydrogen make-up gas is free of carbon oxides and water, or if carbon oxides or water are present they are in such a small amount so as not to effect the stripping. The remainder of the deoxygenation effluent stream is removed as hot high pressure hydrogen stripper bottoms and contains the liquid hydrocarbon fraction having components such as normal hydrocarbons having from about 8 to 24 carbon atoms. A portion of this liquid hydrocarbon fraction in hot high pressure hydrogen stripper bottoms may be used as the hydrocarbon recycle described below, and the stripper bottoms are already at or near the operating conditions of the reaction zone thereby saving the costs involved with pumping or heating of the recycle portion. The stripper bottoms are conducted to a product recovery column.

One purpose of the hot high pressure hydrogen stripper is to separate the gaseous portion of the effluent from the liquid portion of the effluent. As hydrogen is an expensive resource, to conserve costs, the separated hydrogen is recycled to the first reaction zone containing the deoxygenation reactor. Also, failure to remove the water, carbon monoxide, and carbon dioxide from the deoxygenation reactor effluent may result in poor catalyst performance in the isomerization zone. Water, carbon monoxide, carbon dioxide, any ammonia or hydrogen sulfide are selectively stripped in the hot high pressure hydrogen stripper using high purity hydrogen.

The temperature of the hot high pressure hydrogen stripper may be controlled in a limited range to achieve the desired separation and the pressure may be maintained at approximately the same pressure as the reaction zone to minimize both investment and operating costs. The hot high pressure hydrogen stripper may be operated at conditions ranging from a pressure of about 689 kPa absolute (100 psia) to about 13,790 kPa absolute (2000 psia), and a temperature of about 40° C. to about 350° C. In another embodiment the hot high pressure hydrogen stripper may be operated at conditions ranging from a pressure of about 1379 kPa absolute (200 psia) to about 4826 kPa absolute (700 psia), or about 2413 kPa absolute (350 psia) to about 4882 kPa absolute (650 psia), and a temperature of about 50° C. to about 350° C. The hot high pressure hydrogen stripper may be operated at essentially the same pressure as the deoxygenation reaction zone. By "essentially" it is meant that the operating pressure of the high pressure hydrogen stripper is within about 1034 kPa absolute (150 psia) of the operating pressure of the reaction zone. For example, the pressure of the hot high pressure hydrogen stripper separation zone is no more than about 1034 kPa absolute (150 psia) less than that of the reaction zone. Also, the stream entering the hot high pressure hydrogen stripper may be heat exchanged to reduce the temperature before entering the hot high pressure hydrogen stripper. In this way the optimum temperature value needed to achieve the selective separation is obtained prior to entering the hot high pressure hydrogen stripper.

Hydrogen is a reactant in at least some of the reactions above, and to be effective, a sufficient quantity of hydrogen must be in solution to most effectively take part in the catalytic reaction. Past processes have operated at high pressures in order to achieve a desired amount of hydrogen in solution and readily available for reaction. However, higher pressure operations are more costly to build and to operate as compared to their lower pressure counterparts. One advantage of the present invention is the operating pressure may be in the range of about 1379 kPa absolute (200 psia) to about 4826 kPa absolute (700 psia) which is lower than that found in other previous operations. In another embodiment the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, the rate of reaction is increased resulting in a greater amount of throughput of material through the reactor in a given period of time.

In one embodiment, the desired amount of hydrogen is kept in solution at lower pressures by employing a large recycle of hydrocarbon. Other processes have employed hydrocarbon recycle in order to control the temperature in the reaction zones since the reactions are exothermic reactions. However, the range of recycle to feedstock ratios used herein is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the liquid phase in the reaction zone is greatly increased and higher pressures are not needed to increase the amount of hydrogen in solution. In one embodiment of the invention, the volume ratio of hydrocarbon recycle to feedstock is from about 2:1 to about 8:1 or about 2:1 to about 6:1. In another embodiment the ratio is in the range of about 3:1 to about 6:1 and in yet another embodiment the ratio is in the range of about 4:1 to about 5:1.

Although this hydrocarbon fraction is useful as a diesel boiling range fuel, because it comprises essentially n-paraffins, it will have poor cold flow properties. To improve the cold flow properties of the liquid hydrocarbon fraction, the paraffins produced in the first reaction zone are contacted with an isomerization catalyst under isomerization conditions to at least partially isomerize the n-paraffins to branched paraffins. The effluent of the second reaction zone, the isomerization zone, is a branched-paraffin-rich stream. By the term "rich" it is meant that the effluent stream has a greater concentration of branched paraffins than the stream entering the isomerization zone, and preferably comprises greater than 50 mass-% branched paraffins. It is envisioned that the isomerization zone effluent may contain 70, 80, or 90 mass-% branched paraffins. Isomerization can be carried out in a separate bed of the same reaction zone, i.e. same reactor, described above for the deoxygenation reactions or the isomerization can be carried out in a separate reactor. For ease of description the following will address the embodiment where a second reactor is employed for the isomerization reaction. The hydrogen stripped product of the deoxygenation reaction zone is contacted with an isomerization catalyst in the presence of hydrogen at isomerization conditions to isomerize the normal paraffins to branched paraffins. Only minimal branching is required, enough to overcome the cold-flow problems of the normal paraffins. Since attempting for significant branching runs the risk of a high degree of undesired cracking, the predominant isomerized product is a mono-branched paraffin.

The isomerization of the paraffinic product can be accomplished in any manner known in the art or by using any suitable catalyst known in the art. One or more beds of catalyst may be used. It is preferred that the isomerization be operated in a co-current mode of operation. Fixed bed, trickle bed down flow or fixed bed liquid filled up-flow modes are both suitable. See also, for example, US 2004/0230085 A1 which is incorporated by reference in its entirety. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. No. 4,943,424; U.S. Pat. No. 5,087,347; U.S. Pat. No. 5,158,665; and U.S. Pat. No. 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. No. 5,510,306, U.S. Pat. No. 5,082,956, and U.S. Pat. No. 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New Molecular Sieve Process for Lube Dewaxing by Wax Isomerization," written by S. J. Miller, in Microporous Materials 2 (1994) 439-449. The teachings of U.S. Pat. No. 4,310,440; U.S. Pat. No. 4,440,871; U.S. Pat. No. 4,793,984; U.S. Pat. No. 4,758,419; U.S. Pat. No. 4,943,424; U.S. Pat. No. 5,087,347; U.S. Pat. No. 5,158,665; U.S. Pat. No. 5,208,005; U.S. Pat. No. 5,246,566; U.S. Pat. No. 5,716,897; and U.S. Pat. No. 5,851,949 are hereby incorporated by reference.

U.S. Pat. No. 5,444,032 and U.S. Pat. No. 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. No. 5,981,419 and U.S. Pat. No. 5,908,134 teach a suitable bifunctional catalyst which comprises: (a) a porous crystalline material isostructural with beta-zeolite selected from boro-silicate (BOR-B) and boro-aluminosilicate (Al-BOR-B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization catalyst may be any of those well known in the art such as those described and cited above. Isomerization conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia). Other operating conditions for the isomerization zone are well known in the art.

The final effluent stream, i.e. the stream obtained after all reactions have been carried out, is now processed through one or more separation steps to obtain a purified hydrocarbon stream useful as a diesel boiling range fuel. With the final effluent stream comprising both a liquid component and a gaseous component, various portions of which are to be recycled, multiple separation steps may be employed. For example, at least a portion of the hydrogen is first separated in a isomerization effluent separator with the separated hydrogen being removed in an overhead stream. Suitable operating conditions of the isomerization effluent separator include, for example, a temperature of 230° C. and a pressure of 4100 kPa absolute (600 psia). If there is a low concentration of carbon oxides, or the carbon oxides are removed, the hydrogen may be recycled back to the hot high pressure hydrogen stripper for use both as a stripping gas and to combine with the remainder as a bottoms stream. The remainder is passed to the isomerization reaction zone and thus the hydrogen becomes a component of the isomerization reaction zone feed streams in order to provide the necessary hydrogen partial pressures for the reactor. The hydrogen is also a reactant in the oxygenation reactors, and different feedstocks will consume different amounts of hydrogen. The isomerization effluent separator allows flexibility for the process to operate even when larger amounts of hydrogen are consumed in the first reaction zone. Furthermore, at least a portion of the remainder or bottoms stream of the isomerization effluent separator may be recycled to the isomerization reaction zone to increase the degree of isomerization The remainder of the final effluent, after the removal of at least a portion of the hydrogen, still has liquid and gaseous components and is cooled, by techniques such as air cooling or water cooling and passed to a cold separator where the liquid component is separated from the gaseous component. A water byproduct stream is also separated. The gaseous component stream from the cold separator comprises hydrogen, carbon monoxide, carbon dioxide, and hydrogen sulfide while the liquid component stream from the cold separator comprises naphtha and LPG. Suitable operating conditions of the cold separator include, for example, a temperature of about 20 to 80° C. or 40 to 50° C. and a relatively low pressure of about 3447 kPa (500 psia) to about 6895 kPa (1000 psia), with one embodiment at 3850 kPa absolute (560 psia). Again, this separation may be operated at essentially the same pressure as the reaction zone. By "essentially" it is meant that the operating pressure of the cold separator is within about 1034 kPa absolute (150 psia) of the operating pressure of the reaction zone. For example, the pressure of the separator is no more than 1034 kPa absolute (150 psia) less than that of the reaction zone. At least a portion of the liquid component, after cooling and separating from the gaseous component, may be recycled back to the isomerization zone to increase the degree of isomerization.

The liquid component contains the hydrocarbons useful as diesel boiling range fuel as well as smaller amounts of naphtha and LPG. The separated liquid component may be recovered as diesel boiling range fuel or it may be further purified in a product recovery column which separates lower boiling components and dissolved gases from the diesel product containing $C_8$ to $C_{24}$ normal and mono-branched alkanes. Suitable operating conditions of the product recovery column include a temperature of from about 20 to about 200° C. at the overhead and a pressure from about 0 to about 1379 kPa absolute (0 to 200 psia).

The LPG/Naphtha stream may be further separated in a debutanizer or depropanizer in order to separate the LPG into an overhead stream, leaving the naphtha in a bottoms stream. Suitable operating conditions of this unit include a temperature of from about 20 to about 200° C. at the overhead and a pressure from about 0 to about 2758 kPa absolute (0 to 400 psia). The LPG may be sold as valuable product or may be used as feed to a hydrogen production facility. Similarly, the naphtha may be used as feed to a hydrogen production facility.

The gaseous component separated in the product separator comprises mostly hydrogen and the carbon dioxide from the decarboxylation reaction. Other components such as carbon monoxide, propane, and hydrogen sulfide or other sulfur containing component may be present as well. It is desirable to recycle the hydrogen to the deoxygenation zone, but if the carbon dioxide was not removed, its concentration would quickly build up and effect the operation of the deoxygenation zone. The carbon dioxide can be removed from the hydrogen by means well known in the art such as absorption with an amine, reaction with a hot carbonate solution, pressure swing absorption, etc. If desired, essentially pure carbon dioxide can be recovered by regenerating the spent absorption media. However, the separation of carbon dioxide from hydrogen is complicated by the sulfur containing component such as hydrogen sulfide which is present to maintain the sulfided state of the deoxygenation catalyst or to control the relative amounts of the decarboxylation reaction and the hydrogenation reaction that are both occurring in the deoxygenation zone. Because the hydrogen sulfide serves a useful purpose in the deoxygenation reaction zone, it is desirable to recycle the hydrogen sulfide to the reaction zone as opposed to purchasing additional hydrogen sulfide or sulfur components. In some applications, there may be a need to control the level of hydrogen sulfide being recycled which may require removing substantially all the hydrogen sulfide in order to control the amount of separated hydrogen sulfide that is recycled to the reaction zone. Therefore, the techniques for removing the carbon dioxide also need to provide the sulfur management in the process.

In one embodiment of the invention an amine solution absorber is used to selectively remove carbon dioxide while allowing hydrogen and hydrogen sulfide to pass to recycle. In this embodiment the gaseous stream from the cold product separator is routed through an amine solution absorber containing an aqueous solution of a polyoxypropylene triamine having the formula:

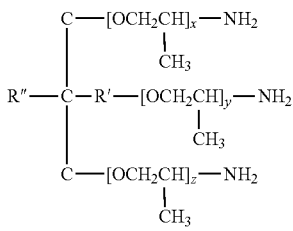

Where R' represents a methylene group and R" represents hydrogen or methyl or ethyl and wherein the sum of X+Y=Z is a positive integer having a value of from about 4 to about 6. These amines are fully described in U.S. Pat. No. 4,710,362 which is hereby incorporated by reference in its entirety. The amine is in an aqueous solution containing about 35 to about 55 wt. % of the polyoxypropylene triamine, and the absorption in the absorber may be conducted at about 20° C. to about 80° C.

In another embodiment, two amine solution absorbers are employed. The first amine absorber removes both carbon dioxide and hydrogen sulfide allowing hydrogen to pass to recycle. The amine chosen to be employed in first amine solution absorber is capable of removing at least both the components of interest, carbon dioxide and the sulfur components such as hydrogen sulfide. Suitable amines are available from DOW and from BASF, and in one embodiment the amines are a promoted or activated methyldiethanolamine (MDEA). The promoter may be piperazine, and the promoted amine may be used as an aqueous solution. See U.S. Pat. No. 6,337,059, hereby incorporated by reference in its entirety. Suitable amines for the first amine solution absorber from DOW include the UCARSOL™ AP series solvents such as AP802, AP804, AP806, AP810 and AP814. The carbon dioxide and hydrogen sulfide are absorbed by the amine while the hydrogen passes through first amine solution absorber to be recycled to the first reaction zone. The amine is regenerated and the carbon dioxide and hydrogen sulfide are released and removed. The regenerated amine may be recycled and reused. The released carbon dioxide and hydrogen sulfide are passed through a second amine solution absorber which contains an amine selective to hydrogen sulfide, but not selective to carbon dioxide. Again, suitable amines are available from DOW and from BASF, and in one embodiment the amines are a promoted or activated MDEA. Suitable amines for the second amine solution absorber zone from DOW include the UCARSOL™ HS series solvents such as HS101, HS 102, HS 103, HS 104, HS115. Therefore the carbon dioxide passes through second amine solution absorber and is available for use elsewhere. The amine may be regenerated which releases the hydrogen sulfide to be recycled. A portion of the hydrogen sulfide may be sent to a Claus plant. Regenerated amine is then recycled and reused. The hydrogen sulfide recycle to the reaction zone may be controlled so that the appropriate amount of sulfur is maintained in the reaction zone. Recycling the hydrogen sulfide may be accomplished by use of a compressor, or the hydrogen sulfide may be dissolved in one of the other recycle liquids. In another embodiment, the hydrogen sulfide may be reacted with olefins present in the feedstock.

Conditions for the first scrubber zone includes a temperature in the range of 20 to 80° C. At least the first absorber is operated at essentially the same pressure as the reaction zone. By "essentially" it is meant that the operating pressure of the absorber is within about 1034 kPa absolute (150 psia) of the operating pressure of the reaction zone. For example, the pressure of the first absorber is no more than about 1034 kPa absolute (150 psia) less than that of the reaction zone. Also, at least the first absorber is operated at a temperature that is at least about 1° C. higher than that of the separator. Keeping the absorber(s) warmer than the separator operates to maintain any light hydrocarbons in the vapor phase and prevents the light hydrocarbons from condensing into the absorber solvent. Conditions for the second amine solution absorber zone may include from about 20 to about 60° C. and a pressure in the range of about 138 kPa (20 psia) to about 241 kPa (35 psia).

The gaseous component stream from the cold product separator has a total volume that is much greater than the combined volume of carbon dioxide and hydrogen sulfide. Typically, the amount of hydrogen sulfide in vapor stream 36 ranges from about 0.01 to about 2 volume-%. In the configurations shown in the figures, the first amine solution absorber zone is sized to accommodate the flow of the entire vapor stream from the cold product separator. However, the second amine solution absorber zone is greatly reduced in size as compared to the first since the flow of material to the second amine solution absorber zone is only a fraction of vapor stream from the cold product separator. The reduction in the size of the second amine solution absorber zone allows for reduced capital and operating costs.

In yet another embodiment, the process may be equipped with a flexible solvent absorber. Processes discussed herein require sulfur management steps to control the sulfur component used in the process. However, not all renewable feedstock diesel processes require sulfur management. Therefore, to provide the greatest degree of flexibility from the process units, a flexible absorber may be employed as the amine solution absorber. A flexible absorber allows for at least two different amine solvents to be alternately supplied to the flexible absorber. The flexible absorber contains a first amine solution for a first application, and then the flexible absorber contains a second amine solution for a second application. The flexible absorber may be used to supply the carbon dioxide selective amine in one application, and the carbon dioxide and hydrogen sulfide selective amine in another application. When sulfur management is required, amines as discussed above may be supplied to the flexible absorber. In applications where sulfur management is not required, other amines may be supplied to the flexible absorber. The flexible absorption system allows for (a) selective removal of carbon dioxide from the recycle gas when feed sulfur content is low (for example in refined soybean oil) and when it is advantageous to allow hydrogen sulfide to build up in the recycle gas to maintain the required hydrogen sulfide partial pressure in the hydrodeoxygenation reaction zone and the flexible absorption also allows for (b) removal of both carbon dioxide and hydrogen sulfide from the recycle gas when the sulfur content in the reaction zone of the feed is high (such as with brown grease) and when it is undesirable for hydrogen sulfide to build up in the recycle gas to the deoxygenation reaction zone. Polyoxypropylenetriamine-rich solvent may be used for case (a) and a formulated MDEA-based solvent such as UCAR-SOL®, may be used for case (b). The choice of solvent will be dictated by the sulfur content in the reaction zone, the hydrodeoxygenation catalyst active metals loading and the target hydrogen sulfide concentration in the reaction zone.

Two separate solvent make-up systems and recycle reservoirs are required. The gas is sent to the bottom of the absorber vessel. The gas flows upward through the acid gas absorption section and then passes through a demisting pad. The absorber is equipped with multiple trays, or packing where the feed gas counter-currently contacts either the carbon dioxide selective polyoxypropylenetriamine-type solvent or the MDEA-based non-selective solvent. In both cases, the cooled lean solvent enters near the tower top through a liquid distributor and flows down through the packing, absorbing either the carbon dioxide while letting the hydrogen sulfide pass through or absorbing both the carbon dioxide and the hydrogen sulfide to the required product specification. This lean solvent line is equipped with an antifoam injection point to allow for the injection of anti-foam when needed. A solvent reservoir is maintained in the bottom of the absorber via liquid level control. High and low level alarms are provided since loss of liquid level can cause high-pressure gas to exit the absorber bottom. The product gas passes through a demisting pad at the top of the absorber to minimize entrainment of liquid. The product gas exiting the absorber leaves the zone water saturated.

As the effluent gas stream from the flexible absorber is recycled to the reaction zone it is typically required that the gas be first cooled and any condensable liquids removed in an appropriate separator. If separated, the condensable aqueous phase liquid recovered could contain solvent and to reduce solvent make-up requirements for the flexible unit, the aqueous phase from this downstream separator should be routed back to the absorber zone. The rich solvent may be regenerated as is known in the art. Two separate regeneration systems may be required, one for each of the different amine solvents that may be used.

The flexible absorber is operated at essentially the same pressure as the reaction zone pressure and near ambient temperature. By "essentially" it is meant that the pressure of the flexible absorber is within 1034 kPa absolute (150 psia) of the pressure of the product separator. The pressure of the flexible absorber is no more than 1034 kPa absolute (150 psia) less than the pressure of the product separator. Lean solvent should enter the absorber slightly warmer than the acid gas stream so as to prevent condensation of any light product hydrocarbons in the amine solvent.

For the amine solvent which selectively removes only carbon dioxide, the absorber effluent gas will contain from about 100 to about 1000 ppm carbon dioxide and >50% of the hydrogen sulfide present in the gas entering the absorber. For the amine solvent which selectively removes both carbon dioxide and hydrogen sulfide, the absorber effluent gas will contain <1 ppm hydrogen sulfide and from about 100 to about 1000 ppm carbon dioxide.

Figure 3:
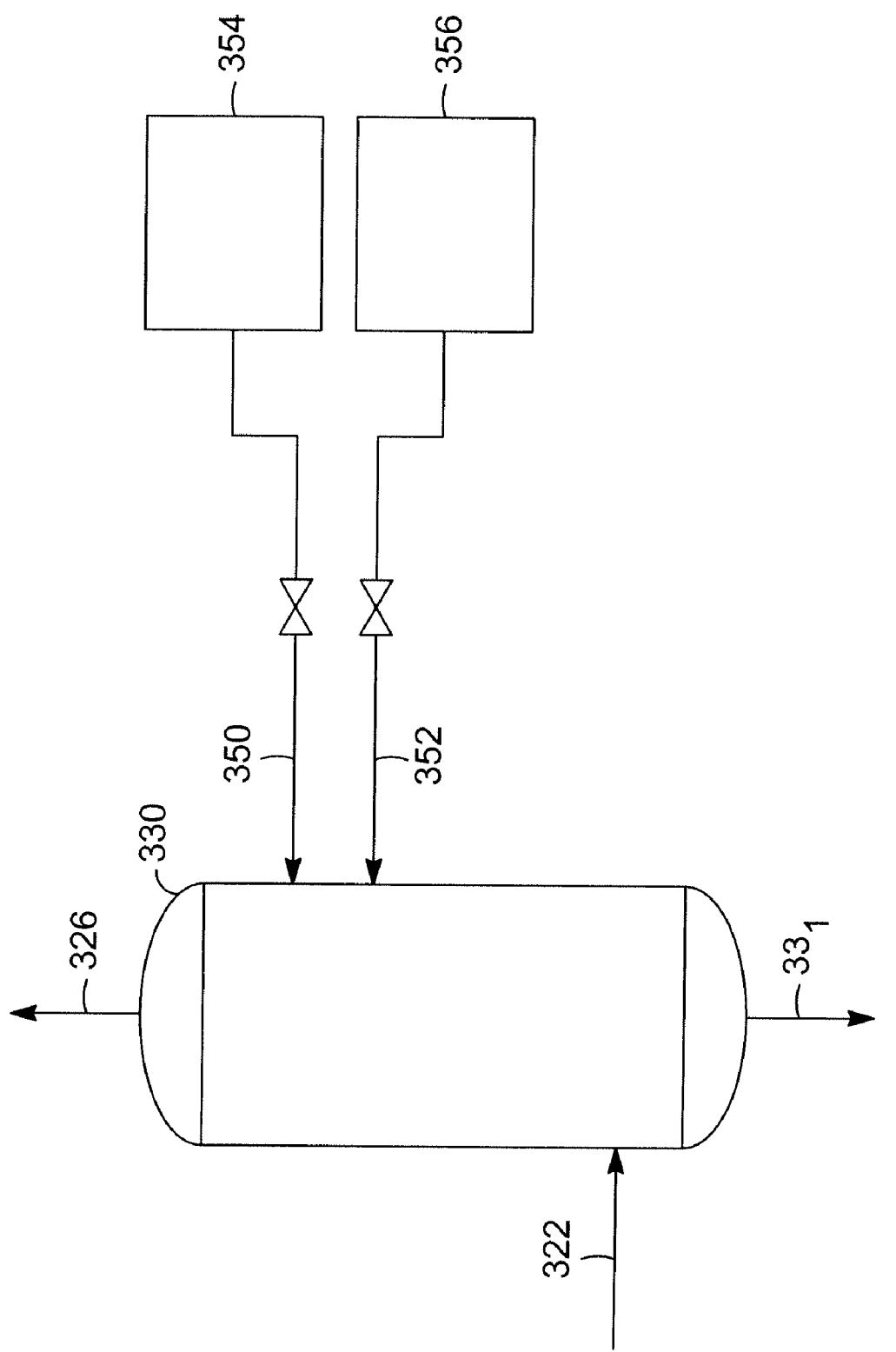
FIG. 3 is a portion of a flow scheme showing the operation of the flexible absorber embodiment.

At least one flexible absorber would be used in the place of a traditional absorber, but it is within the scope of the invention to replace all traditional absorbers with flexible absorbers. FIG. 3. shows a drawing of a sample flexible absorber. Vapor stream 322 from the cold product separator enters flexible absorber 330. Liquid amine solution absorber is introduced through either line 350 or 352. Line 350 is connected to first solvent source 354 and line 352 is connected to second solvent source 356. Each of the two solvent sources provide a solvent of differing selectivity. For example, first solvent source 354 may provide a solvent of the type disclosed in U.S. Pat. No. 4,710,362 and second solvent source 356 may provide a solvent such as the UCARSOL™ AP series solvents from DOW such as AP802, AP804, AP806, AP810 and AP814. As an example, when an application calls for only carbon dioxide to be removed from the stream 322, the solvent from the first solvent source 354 would be directed to flexible absorber 330. However, when an application requires both carbon dioxide and hydrogen sulfide to be removed from the stream 322, solvent from the second source would be directed to flexible absorber 320. In either case, solvent is removed from flexible absorber 330 via line 341 and conducted to a regeneration zone.

Other separation systems are possible, such as adsorbents and treating processes. However, the amine solution absorber systems of the present invention have several advantages with cost being a primary advantage. Amine solution absorber systems are less costly than molecular sieve adsorbents or treating processes, and the amine systems minimize the amount of hydrogen lost to the acid gas containing stream(s).

The hydrogen stream remaining after the removal of the carbon dioxide may be recycled to the reaction zone. The hydrogen stream may contain the hydrogen sulfide being recycled to the reaction zone, or the separated hydrogen sulfide may be recycled independently such as in controlled amounts. The hydrogen recycle stream may be introduced to the inlet of the reaction zone and/or to any subsequent beds/reactors.

The following embodiment is presented in illustration of this invention and is not intended as an undue limitation on the generally broad scope of the invention as set forth in the claims. First the process is described in general as with reference to FIG. 1. Then the process is described in more detail with reference to FIG. 2.

Turning to FIG. 1 renewable feedstock 102 enters deoxygenation reaction zone 104 along with recycle hydrogen and hydrogen sulfide stream 126 and optional product recycle 112. Hydrogen sulfide or another sulfur-containing component may be already present in or added to the renewable feedstock. In an alternate embodiment, hydrogen sulfide or another sulfur-containing component may be added to the reactor in reaction zone 104. Contacting the renewable feedstock with the deoxygenation catalyst generates deoxygenated product 106 which is directed to isomerization zone 108 which contains a first selective separation zone comprising a hot high pressure hydrogen stripper. Hydrogen-rich make-up gas 110, optional recycle hydrogen 126a, and optional product recycle 112a are added to isomerization zone 108.

Carbon oxides, hydrogen sulfide, and water vapor are removed with hydrogen in hot high pressure hydrogen stripper overhead and separated deoxygenated liquid product is removed in hot high pressure hydrogen stripper bottoms. The bottoms are passed to the isomerization reaction for conversion of branched paraffins. The effluent 116 of isomerization zone 108 is passed to product recovery zone 120. Note that effluent 116 is shown as a single representative line, but in actuality maybe two or more separate conduits. Product recovery zone 120 comprises at least a cooler, a cold product separator, and a product recovery column. Carbon oxides, hydrogen sulfide, and hydrogen stream 122, light ends stream 124, water byproduct stream 128, and paraffin-rich product 118 are all removed from product recovery zone 120. Paraffin-rich product 118 may be collected for use as diesel boiling range fuel or fuel blending component. A portion of branched paraffin rich product 112 may be recycled to combine with feed 102, and a portion of branched paraffin rich product 112a may be recycled to combine with deoxygenation zone effluent 106. Carbon oxides, hydrogen sulfide, and hydrogen stream 122 is directed to second selective separation zone 130 which contains one or more selective amine solution absorbers. At least carbon dioxide is removed from stream 122 via line 132. Optionally hydrogen sulfide may be removed as well (not shown). Hydrogen recycle stream containing hydrogen sulfide 126 is removed from second selective separation zone 130 and recycled to the deoxygenation reaction zone 104.

Figure 2:
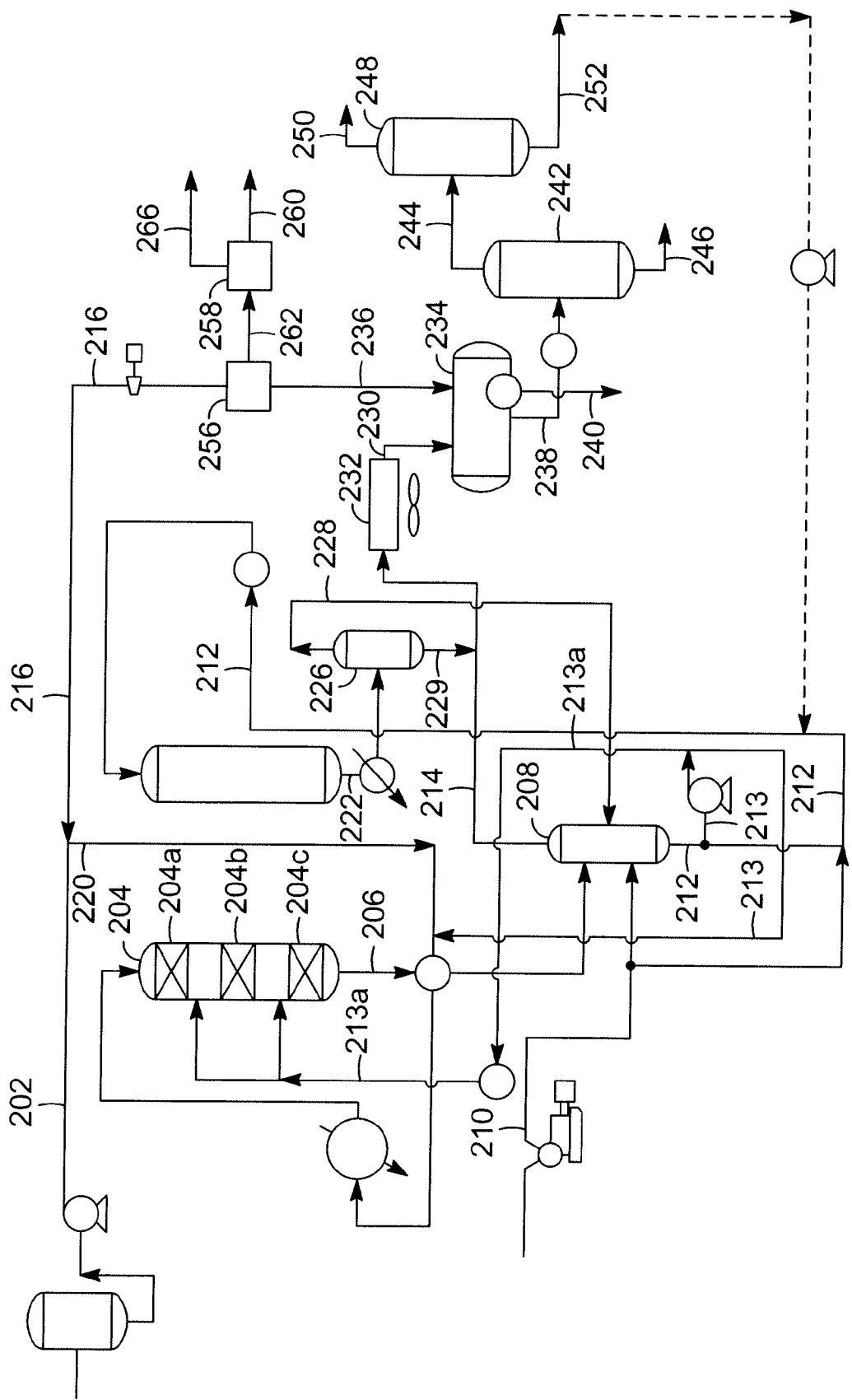

Turning to FIG. 2, the process begins with a renewable feedstock stream 202 which may pass through an optional feed surge drum. The feedstock stream is combined with recycle stream 216 to form combined feed stream 220, which is heat exchanged with reactor effluent and then introduced into deoxygenation reactor 204. The heat exchange may occur before or after the recycle is combined with the feed. Deoxygenation reactor 204 may contain multiple beds shown in FIG. 2 as 204a, 204b, and 204c. Deoxygenation reactor 204 contains at least one catalyst capable of catalyzing decarboxylation and/or hydrodeoxygenation of the feedstock to remove oxygen. Deoxygenation reactor effluent stream 206 containing the products of the decarboxylation and/or hydrodeoxygenation reactions is removed from deoxygenation reactor 204 and heat exchanged with stream 220 containing feed to the deoxygenation reactor. Stream 206 comprises a liquid component containing largely normal paraffin hydrocarbons in the diesel boiling range and a gaseous component containing largely hydrogen, vaporous water, carbon monoxide, carbon dioxide and propane.

Deoxygenation reactor effluent stream 206 after one or more optional heat exchanges, is directed to hot high pressure hydrogen stripper 208. Make up hydrogen in stream 210 is also introduced to hot high pressure hydrogen stripper 208. In hot high pressure hydrogen stripper 208, the gaseous component of deoxygenation reactor effluent 206 is stripped from the liquid component of deoxygenation reactor effluent 206 using make-up hydrogen 210 and optional recycle hydrogen 211. The gaseous component comprising hydrogen, vaporous water, carbon monoxide, carbon dioxide and possibly some hydrogen sulfide and propane, is separated into hot high pressure hydrogen stripper overhead stream 214. The remaining liquid component of deoxygenation reactor effluent 206 comprising primarily normal paraffins having a carbon number from about 8 to about 24 with a cetane number of about 60 to about 100 is removed as hot high pressure hydrogen stripper bottoms 212.

A portion of hot high pressure hydrogen stripper bottoms forms recycle stream 213 and is combined with renewable feedstock combined stream 220. Another portion of recycle stream 213, optional stream 213a, may be routed directly to deoxygenation reactor 204 and introduced at interstage locations such as between beds 204a and 204b and/or between beds 204b and 204c in order, for example, to aid in temperature control. The remainder of hot high pressure hydrogen stripper bottoms in stream 212 is routed to isomerization zone 280 where it contacts an isomerization catalyst to convert normal paraffins to branched paraffins. Stream 212 may be heat exchanged with isomerization reactor effluent 222.

The product of the isomerization reactor containing a gaseous portion of hydrogen and propane and a branched-paraffin-rich liquid portion is removed in line 222, and after optional heat exchange with stream 212, is introduced into hydrogen separator 226. The overhead stream 228 from hydrogen separator 226 contains primarily hydrogen which may be recycled back to hot high pressure hydrogen stripper 208. Bottom stream 229 from hydrogen separator 226 is air cooled using air cooler 232 and introduced into product separator 234. In product separator 234 the gaseous portion of the stream comprising hydrogen, carbon monoxide, hydrogen sulfide, carbon dioxide and propane phase separate and are removed in stream 236 while the liquid hydrocarbon portion of the stream is removed in stream 238. A liquid water byproduct stream 240 may also be removed from product separator 234. Stream 238 is introduced to product recovery column 242 where components having higher relative volatilities are separated into stream 244 with the remainder, the diesel range components, being withdrawn from product recovery column 242 in line 246. Stream 244 is introduced into fractionator 248 which operates to separate LPG into overhead 250 leaving a naphtha bottoms 252.

The vapor stream 236 from product separator 234 contains the gaseous portion of the isomerization effluent which comprises at least hydrogen, carbon monoxide, hydrogen sulfide, carbon dioxide and propane and is directed to a system of at least one amine solution absorber to separate carbon dioxide and hydrogen sulfide from the vapor stream. Because of the cost of hydrogen, it is desirable to recycle the hydrogen to deoxygenation reactor 204, but it is not desirable to circulate the carbon dioxide or too much of an excess of sulfur containing components. In order to separate sulfur containing components and carbon dioxide from the hydrogen, vapor stream 236 is passed through a system of at least two amine solution absorbers, also called scrubbers, starting with the first amine solution absorber zone 256. The amine chosen to be employed in first amine absorber 256 is capable of selectively removing at least both the components of interest, carbon dioxide and the sulfur components such as hydrogen sulfide. Suitable amines are available from DOW and from BASF, and in one embodiment the amines are a promoted or activated methyldiethanolamine (MDEA). The promoter may be piperazine, and the promoted amine may be used as an aqueous solution. See U.S. Pat. No. 6,337,059, hereby incorporated by reference in its entirety. Suitable amines for the first amine solution absorber zone from DOW include the UCARSOL™ AP series solvents such as AP802, AP804, AP806, AP810 and AP814. The carbon dioxide and hydrogen sulfide are absorbed by the amine while the hydrogen passes through first amine absorber zone and into line 216 to be recycled to reaction zone 204. The amine is regenerated and the carbon dioxide and hydrogen sulfide are released and removed in line 262. Within the first amine solution absorber zone, regenerated amine may be recycled for use again. The released carbon dioxide and hydrogen sulfide in line 262 are passed through second amine solution absorber zone 258 which contains an amine selective to hydrogen sulfide, but not selective to carbon dioxide. Again, suitable amines are available from DOW and from BASF, and in one embodiment the amines are a promoted or activated MDEA. Suitable amines for the second amine solution absorber zone from DOW include the UCARSOL™ HS series solvents such as HS101, HS102, HS103, HS 104, HS115. Therefore the carbon dioxide passes through second amine absorber zone 258 and into line 266. The amine may be regenerated which releases the hydrogen sulfide into line 260. At least a portion of the hydrogen sulfide in line 260 may be recycled (not shown) to the reaction zone 204, possibly in measured controlled amount. Excess hydrogen sulfide may be directed to a Claus plant. Regenerated amine is reused. Conditions for the first amine solution absorber zone include from about 20 to about 60 C and a pressure in the range of about 3447 kPa (500 psia) to about 6895 kPa (1000 psia). Conditions for the second amine solution absorber zone includes from about 20 to about 60° C. and a pressure in the range of about 138 kPa (20 psia) to about 241 kPa (35 psia).

In another embodiment, the amine solution absorber zone 256 may contain the amine solution of U.S. Pat. No. 4,710, 362 which selectively separates only the carbon dioxide and allows the hydrogen sulfide to pass with the hydrogen into recycle line 216. In this embodiment, the second amine absorber zone 258 is not necessary.

In yet another embodiment, amine solution absorber zone 256 may contain the flexible amine absorber such as shown in FIG. 3 and described in detail above. In this embodiment, the amine solvent best suited for the separation required is provided to the absorber. In this embodiment, the second amine absorber zone 258 is not necessary.

Other separation systems are possible, such as adsorbents and treating processes. However, the amine solution absorber zone system of FIG. 2 has several advantages with cost being a primary advantage. Amine solution absorber systems are less costly than molecular sieve adsorbents or treating processes. Vapor stream 236 has a total volume that is much greater than the combined volume of carbon dioxide and hydrogen sulfide. Typically, the amount of hydrogen sulfide in vapor stream 236 ranges from about 1 to about 5 mass-%. In the configuration shown in FIG. 2, the first amine solution absorber zone 256 is sized to accommodate the flow of the entire vapor stream 236. However, the second amine solution absorber zone 258 is greatly reduced in size as compared to the first since the flow of material to the second amine solution absorber zone is only a fraction of vapor stream 236. The reduction in the size of the second amine solution absorber zone allows for reduced capital and operating costs.

The invention claimed is:

1. A process for producing a branched paraffin-rich diesel product from a renewable feedstock comprising:
    a) treating the renewable feedstock in a first reaction zone by hydrogenating and deoxygenating the feedstock using a catalyst at reaction conditions in the presence of hydrogen and at least one sulfur containing compound to provide a first reaction zone product stream comprising hydrogen, hydrogen sulfide, carbon dioxide, and a hydrocarbon fraction comprising n-paraffins useful as a diesel boiling range fuel;
    b) selectively separating, in a hot high pressure hydrogen stripper, a gaseous stream comprising hydrogen, hydrogen sulfide, and at least a portion of the water and carbon dioxide from the first reaction zone product stream and introducing a remainder stream comprising at least the n-paraffins to a second reaction zone to contact an isomerization catalyst at isomerization conditions to isomerize at least a portion of the n-paraffins and generate a branched paraffin-rich stream;
    combining the branched-paraffin-rich stream and the gaseous stream to form a combined stream and s will replace all prior versions, and listings, of claims in the application;
    c) cooling and separating to provide:
        i) a gaseous component comprising at least hydrogen and carbon dioxide
        ii) a hydrocarbon component comprising paraffins; and
        iii) a water component
        and recovering at least a portion of the hydrocarbon component;

d) selectively separating the gaseous component in a first amine solution absorber zone to produce a stream comprising at least hydrogen and depleted in carbon dioxide and a stream comprising carbon dioxide and hydrogen sulfide;

e) selectively separating the stream comprising carbon dioxide and hydrogen sulfide in a second amine solution absorber zone to produce a stream comprising at least hydrogen sulfide and depleted in carbon dioxide and a stream comprising carbon dioxide; and f) recycling at least a portion of the stream comprising at least hydrogen and depleted in carbon dioxide and at least a portion of the stream comprising at least hydrogen sulfide and depleted in carbon dioxide to the first reaction zone.

2. The process of claim 1 wherein the first and second amine solution absorber zones each comprise an aqueous solution of methyldiethanolamine and piperazine.

3. The process of claim 1 further comprising separating at least a portion of the hydrogen from the branched paraffin-rich stream and recycling the hydrogen separated from the branched paraffin-rich stream to the hot high pressure hydrogen stripper.

4. The process of claim 1 further comprising recycling a portion of the remainder stream comprising a least the n-paraffins to the first reaction zone at a volume ratio of recycle to feedstock in the range of about 2:1 to about 8:1.

5. The process of claim 1 wherein the reaction conditions in the first and second reaction zones include a temperature of about 40° C. to about 400° C. and a pressure of about 689 kPa absolute (100 psia) to about 13,790 kPa absolute (2000 psia).

6. The process of claim 1 further comprising separating the hydrocarbon component into an LPG and naphtha stream and a diesel boiling range stream.

7. The process of claim 6 further comprising separating the LPG and naphtha stream into an LPG stream and a naphtha stream.

8. The process of claim 1 further comprising introducing a make up hydrogen stream to the hot high pressure hydrogen stripper.

9. The process of claim 1 further comprising combining a high purity make-up hydrogen stream with the remainder stream.

10. The process of claim 1 wherein the hot high pressure hydrogen stripper is operated at a temperature of about 40° C. to about 300° C. and a pressure of about 689 kPa absolute (100 psia) to about 13,790 kPa absolute (2000 psia).

11. The process of claim 1 wherein the steps 1 a), 1 b), 1 c), and 1 d) are conducted at essentially the same pressure as the first reaction zone.

12. The process of claim 1 wherein the separation step 1 d) is conducted at a temperature at least 1° C. greater than the temperature of the separation step 1 c).

13. The process of claim 1 wherein the recycling of at least a portion of the stream comprising at least hydrogen sulfide and depleted in carbon dioxide to the first reaction zone of step 1 f) further comprises a technique selected from the group consisting of recycling through employing a compressor, dissolving the portion of the stream comprising at least hydrogen sulfide and depleted in carbon dioxide into another recycle stream, and reacting the portion of the stream comprising at least hydrogen sulfide and depleted in carbon dioxide with an olefin component of the feedstock.

14. The process of claim 1 further comprising treating a petroleum derived feedstock in the first reaction zone with the renewable feedstock.

15. The process of claim 1 wherein the renewable feedstock comprises at least one component selected from the group consisting of canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, cottonseed oil, inedible tallow, yellow and brown greases, lard, train oil, fats in milk, fish oil, algal oil, sewage sludge, ratanjoy oil, wild castor oil, jangli oil erandi oil, mohuwa oil, karanji honge oil, neem oil, and mixtures thereof.

16. The process of claim 1 wherein the renewable feedstock further comprises at least one co-feed component selected from the group consisting of spent motor oils, spent industrial lubricants, used paraffin waxes, liquids derived from the gasification of coal followed by a downstream liquefaction step, liquids derived from the gasification of biomass followed by a downstream liquefaction step, liquids derived from the gasification of natural gas followed by a downstream liquefaction step, liquids derived from depolymerization of waste plastics, synthetic oils, and mixtures thereof.

* * * * *